Aug. 11, 1953
L. S. PARKER
2,648,233
VARIABLE POWER STEERING GEAR
Filed March 7, 1952
2 Sheets-Sheet 1
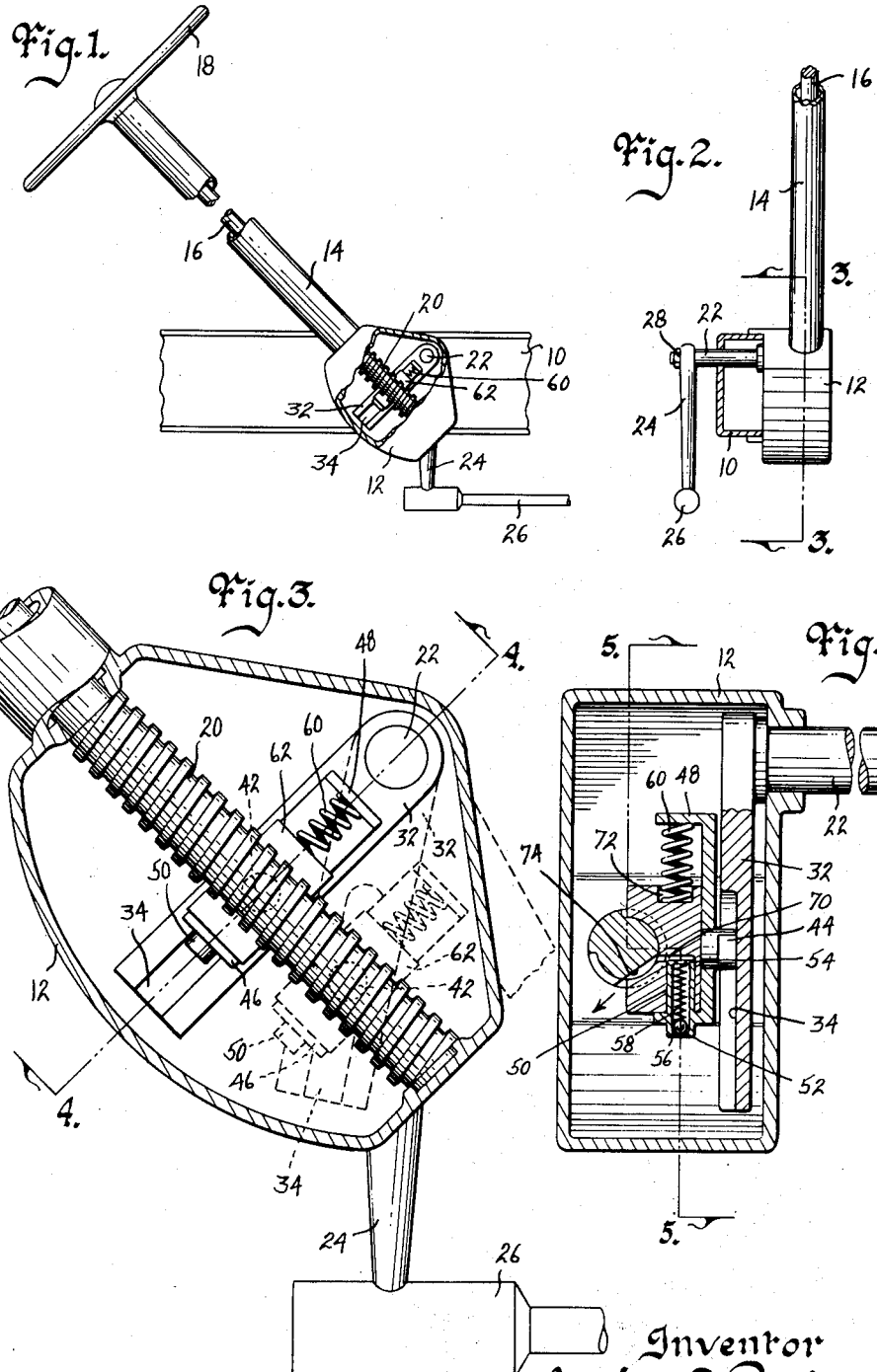
Inventor
Loring S. Parker
by Talbert Dick & Adler
Attorneys
Witness
Edward P. Seeley

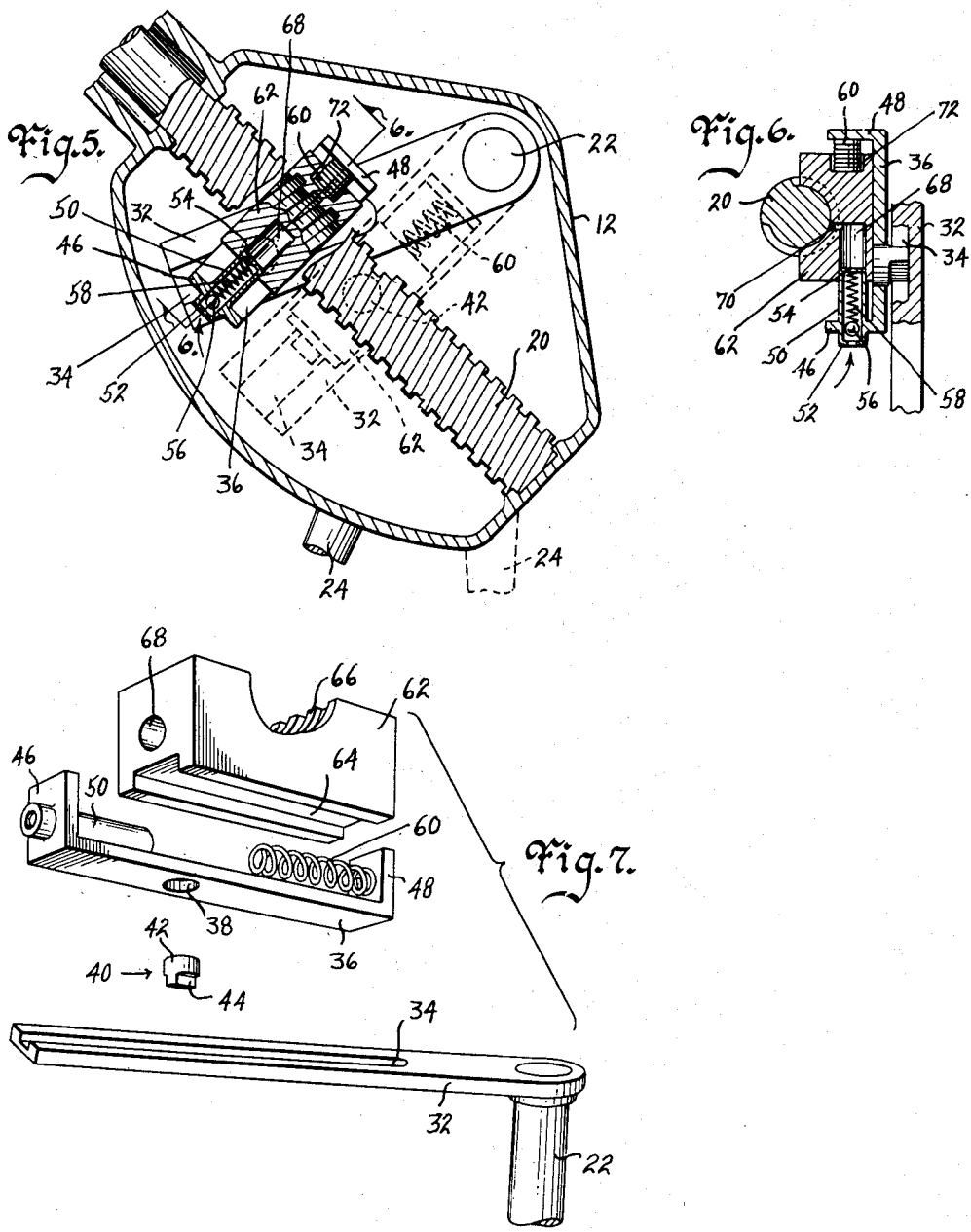
Aug. 11, 1953 — L. S. PARKER — 2,648,233
VARIABLE POWER STEERING GEAR
Filed March 7, 1952 — 2 Sheets-Sheet 2
Inventor
Loring S. Parker
by Talbert Dick & Adler
Attorneys Patented Aug. 11, 1953

2,648,233

UNITED STATES PATENT OFFICE 2,648,233

VARIABLE POWER STEERING GEAR

Loring S. Parker, Des Moines, Iowa, assignor of one-half to Glen W. Kauffman, Waukee, Iowa Application March 7, 1952, Serial No. 275,254

10 Claims. (Cl. 74—499)

1

My invention relates to variable power steering gears.

More particularly my invention is adapted for use with the steering assembly of an automotive vehicle and while it may be used in other environments, my preferred embodiment is shown, described and illustrated in relation to its use on vehicles.

It is well known that the principle of the lever has been incorporated in the steering mechanism of motor vehicles. Consequently, from an intermediate position, the movement of the wheels will be of a given distance in relation to a given movement of the steering wheel. The force required to move the steering wheel varies in relation to whether the vehicle is in motion or stationary, it requiring a greater force to turn the wheels when not in motion due to the resistance from the wheel end of the steering. As a result, a steering gear that gives a maximum turn of the wheels with a minimum turn of the steering wheel is said to have a low gear ratio and is highly suitable from the standpoint of control when the vehicle is moving, since relatively little force on and movement of the steering wheel is required to move the wheels a maximum distance. On the other hand, a low ratio requires relatively considerable force in turning the wheels at a standstill and consequently creates the impression that the steering is hard and difficult when parking a car, for example.

The importance of this problem is well known to automobile manufacturers, since a car that is hard to park has a disadvantage commercially when considered from the standpoint of the women drivers who are now numbered in the hundreds of thousands. To overcome this problem, many cars today have a high gear ratio in the steering mechanism so that in parking, relatively little force is required to turn the wheels and at the same time, the amount of wheel movement is less in relation to the turning of the steering wheel. Obviously, of course, with a high gear ratio more revolutions of the steering wheel are necessary to get the same distance of wheel turning than with a low ratio. However, where the low gear ratio was desirable while driving and had drawbacks in parking, likewise the high gear ratio overcomes the parking problem, but is decidedly a disadvantage from the standpoint of safety in controlling the car while in motion due to the fact that only a minimum of wheel turning is produced by a maximum of steering wheel movement.

The current trend in easy steering embodies

2 what has been termed power steering. This is accomplished generally by hydraulic pressure so that whether the car is in motion or at a standstill, a slight pressure on the steering wheel starts hydraulic power in action to operate the steering. This requires additional mechanism and is an extremely expensive piece of vehicle equipment.

In my Patent No. 1,992,440, I disclosed a means for varying the gear ratio on the steering assembly that was manually operated so that a high or low ratio could be selected for steering while in motion or at a standstill.

In my present invention, the principal object is to provide an improvement in a steering assembly whereby the gear ratio is automatically variable.

More particularly, it is an object of this invention to provide a variable power steering gear that automatically establishes a low gear ratio while the vehicle is in motion and a high gear ratio when steering is done while the vehicle is at a standstill.

A further object of this invention is to provide a variable power steering gear of the above class that is automatically responsive to a reaction force originating in resistance to turning by the wheels to be turned whereby the gear ratio is automatically progressively varied as the situation demands.

A still further object of this invention is to provide a mechanism of the above classes in which there is a movable connection between the steering wheel shaft and the lever associated with the wheels to be turned whereby the connecting point between the steering shaft and lever is automatically movd toward and away from the pivotal axis of the lever.

Another object of my invention is to provide a variable power steering gear having the characteristics above described that is extremely economical in manufacture.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a side elevational view of my steering gear shown mounted in a steering assembly of a motor vehicle with a portion of the gear housing cut away to more fully illustrate the gear arrangement, Fig. 2 is a rear elevation view of my invention shown in Fig. 1, Fig. 3 is an enlarged cross-sectional view of this device taken on the line 3—3 of Fig. 2, showing it in solid lines on a lever which is in intermediate position and in broken lines when the lever has been moved away from intermediate position without any adjustment of the connecting point between the steering shaft and lever, Fig. 4 is a cross-sectional view of this device taken on the line 4—4 of Fig. 3, Fig. 5 is an enlarged cross-sectional view taken on the line 5—5 of Fig. 4 with the broken lines representing the solid line intermediate position of Fig. 3, and the solid lines showing an adjustment of the connection between the steering shaft and the lever when not in intermediate position, Fig. 6 is a cross-sectional view taken on the line 6—6 of Fig. 5, and Fig. 7 is an exploded view of this device and the lever which it operates.

Referring to the drawings, I have used the numeral 10 to designate generally the frame of a motor vehicle to which a gear housing 12 is suitably secured. Connected to the housing 12 and extending rearwardly and upwardly therefrom is the steering column or post 14 in which is rotatably mounted the steering rod or shaft 16 that is operated by a steering wheel 18. The lower portion of the steering shaft is threaded as at 20 and this threaded portion projects into the gear housing as shown. It will of course be understood that suitable bearings of any desired kind may be provided in mounting the shaft 16. A rotatable shaft 22 has one end journalled in the wall of the gear housing 12 with its greater length extending outwardly therefrom as shown in Fig. 2. A pitman 24 connects the outer end of the shaft 22 with an ordinary drag link 26 forming a part of the steering mechanism of the vehicle. A nut 28 or other suitable means may be used to secure the pitman to the shaft 22 and this connection should preferably be machined in any suitable manner as at 30 in Fig. 4 so that rotation of shaft 22 will move the pitman 24 without slippage.

Within the gear housing 12 is a lever member 32 having one end fixed to the inner end of the shaft 22. The main body of this lever is provided with a longitudinal elongated groove 34. Thus arranged the body of this lever is generally transversely of the longitudinal axis of the steering shaft 14 and particularly the threaded portion 20. In what I will call intermediate position this lever is perpendicular to the longitudinal axis of the steering shaft portion 20, as illustrated in the solid lines of Fig. 3. A slide bar 36 is arranged on the lever 32 so as to be movable thereon and an opening 38 transversely through this bar is adapted to register with the groove 34 at all times. A gudgeon-like pin 40 has a round head portion 42 which is rotatably arranged in the opening 38 and a reduced rectangular shank 44 that is slidably contained within the groove 34. Thus, the slide bar 36 is connected to the lever 32, but the point of connection will vary from the pivotal axis of the lever depending upon the position of the bar on the lever. Thus, as the bar may be moved longitudinally toward or away from the pivotal axis of the lever, the length of the lever for operating purposes will vary accordingly. It is also pointed out that the bar 36 being pivotally connected to the lever 32 by means of the pin 40 is also capable of a transverse movement across the lever as is apparent from the broken line illustration in Fig. 3. The ends of the slide bar 36 are provided with the respective upwardly extending sides 46 and 48 as shown in Fig. 7. A tubular or cylindrical member 50 extends transversely through the side 46 so that its major portion is on the inside of the side 46 and extends longitudinally of the bar 36 toward but not to the opening 38 and is spaced slightly above the bar as illustrated. The orifice at each end of the member 50 is reduced in size relative to the diameter of its main body portion to provide the shoulder members 52 and 54 (Figs. 4, 5 and 6), and contained within this cylinder is a one-way ball check valve 56 engageable with the shoulder 52 to close off at times the orifice at the outer end. A spring means 58 extends between the inner side of the ball 56 and the shoulder 54 and is adapted to normally urge the ball 56 against the shoulder 52. To the inside of the side 48 one end of a coil spring or suitable yielding means 60 is fixed and its length extends longitudinally of the bar 36 towards but not to the opening 38.

A rectangular block member 62 is provided with a longitudinal groove 64 in its bottom side that is co-extensive with the length thereof. Transversely of the top side of this block is a groove 66 that has threads adapted to cooperate with the steering portion 20 as I will later describe. A cylindrical chamber 68 extends from one end of the block 62 inwardly to a point below the groove 66 and communicates with this groove by means of the passageway 70 as more clearly illustrated in Fig. 6. The other end of the block is preferably provided on its outer side with a recess 72 (Figs. 4 and 5). Thus constructed, this block is mounted on the slide bar 36 so that the bar portion 36 is longitudinally slidably contained within the groove 64, the free end of the spring 60 engages the recess 72 and the cylinder 50 is slidably positioned within the chamber 68. The steering shaft portion 20 rests in the groove 66 so that the respective threads in this groove and on the shaft are in cooperative engagement. On the steering shaft 16 midway between the longitudinal extremities of the threaded portion 20, I provide the flat spot 74 on the threads as illustrated in Fig. 4 which serves as a valve means as I will later point out. The gear box, when this device is used, is filled or substantially filled with a liquid having the viscosity of oil.

The operation of this invention will be described in relation to its use on a motor vehicle, although it is not intended that its use be limited to that one adaptation.

When the vehicle wheels are straight, or in what might be called the starting position from which the parts of this assembly move, the lever 32 is in what I call intermediate position, and the bar 36 is yieldingly held by spring 60 at one extreme point of movement relative to its position on the lever so that the shortest line of travel possible exists between the pivotal axis of the lever and the pin 40. This is indicated in solid lines in Fig. 3 where the long axis of the lever 32 is perpendicular to the steering shaft 20 and the pin 40 registers with an imaginary line transversely through the center of the steering shaft portion 20. This position is considered a low gear ratio as a minimum rotation of the steering shaft will result in maximum turning of the wheels due to the relatively small distance between the pin 40 and pivotal axis of the lever 32. When the vehicle is in motion and there is little resistance from the wheels to turning, the operation of this device is illustrated by the broken lines in Fig. 3, the principle of which is well known and no invention being claimed thereto. Here the steering shaft has been rotated to the left or counterclockwise and the lever 32, block 62 and slide bar 36 will move downwardly as shown. The spring 60 is designed to withstand a given pressure or force and this should normally be greater than the resistance resulting from turning the wheels while in motion. Consequently, in steering a moving vehicle, the spring 60 remains extended so that the relative position of the pin 40 and steering shaft remains substantially the same as in the starting position. Obviously, however, the movement of the lever 32 away from intermediate will result in an increase in distance between the pin and pivotal axis of the lever. This is not new and when the lever has moved to an extreme point from intermediate, there will be a high gear ratio. Since the lever moves in an arc, it is obvious that the point of connection between the shaft 20 and lever 32 and the pivotal axis of the lever will be greater as the distance from intermediate position increases. Such a change from low to high gear and vice versa is progressive in action and is a well known result in the use of a lever as illustrated. This change of gear ratio, however, is wholly dependent on the distance of travel by the lever, and in my invention I have provided a means for varying the gear ratio that is responsive to a reaction force created by resistance of the wheels to turning.

Returning now to the starting position of my invention, let us assume that the vehicle is at a standstill and it is desired to turn the wheels as for parking. If the steering shaft is rotated to the right or clockwise, the lever and its related parts moves upwardly as indicated by the solid lines of Fig. 5. Since the vehicle is not moving, there is greater resistance from the wheels to turning. This resistance is transmitted as a reaction force from the wheels to the lever 32 and when it becomes greater than the capacity of spring 60 to resist, this spring yields or compresses causing the bar 36 to slide away from the pivotal axis of the lever. Obviously, this moves the pin 40 in the same direction so that the connecting point between the steering shaft and lever is now at a greater distance from pivotal axis of the lever. Thus, at the outset in turning at a standstill, a high gear ratio is automatically provided and while maximum rotating of the steering shaft will produce only a minimum of wheel turning, there is considerably less effort required by the operator in parking the vehicle.

As the slide bar 36 moves as described, the cylinder 50 is partially withdrawn from the chamber 68. When this occurs, oil enters the cylinder by flowing past the valve 58 where it fills and is trapped in the chamber 68 so that the slide bar cannot freely move back to its starting position and thus the high gear ratio is maintained. In other words, the solid column of oil within the chamber 68 and cylinder 50 acts as a restraining force or means to hold the bar 36 in its extended position relative to the pivotal axis of the lever, and this force remains active until the oil trapped in the chamber 68 is released. The release of this oil occurs as soon as the steering shaft is rotated to bring the lever to intermediate position, at which point the flat portion 74 registers with the passageway 70 and serves as a valve means to allow the oil to bleed out of the chamber through this passageway into the casing, during which action the bar 36 is returned to intermediate position by spring 60. While I have illustrated the valving of the chamber 68 by means of the flat surface on the steering shaft registering with the passageway 70, it will be appreciated that such valving can be accomplished in a variety of ways without departing from the principle of my invention. Once the chamber 68 is empty, then as the shaft 20 is again rotated, the flat portion or valve means 74 closes the passageway 70 to seal the chamber 68 and the operation of this device is repeated as described.

It will be appreciated that the change from a low to high gear ratio is entirely automatic depending only on the reaction force from the wheels, and the strength of the spring 60 can be varied to put this device into operation under any steering conditions desired. It will also be understood that while I have described the operation of my device in changing the steering mechanism from a low to high ratio when a vehicle is at a standstill, that a slow moving vehicle may provide sufficient resistance to turning that a relative increase of gear ratio will result according to the principle of this invention.

Some changes may be made in the construction and arrangement of my variable power steering gear without departing from the real spirit and purpose of my invention, and it is my intention to cover by my claims, any modified forms of structure or use of mechanical equivalents which may be reasonably included within their scope.

I claim:

1. In a device of the class described, a shaft, a second rotatably mounted shaft, a lever fixed on said second shaft, a bar longitudinally slidably arranged on said lever, a member on said bar movable therewith relative to said lever, said member operatively connected to said lever so that the length of the line of travel between the pivotal axis of said lever and said member varies relative to the position of said bar on said lever, a block member operatively connected with said first shaft, said block in slidable engagement with said bar, and said bar movable at right angles to said first shaft in response to resistance of said second shaft to rotation.

2. In a device of the class described, a shaft, a second rotatably mounted shaft, a lever fixed on said second shaft, a bar longitudinally slidably arranged on said lever, a member on said bar movable therewith relative to said lever, said member operatively connected to said lever so, that the length of the line of travel between the pivotal axis of said lever and said member varies relative to the position of said bar on said lever, a block member operatively connected with said first shaft, said block in slidable engagement with said bar, and said bar movable at right angles to said first shaft in response to resistance of said second shaft to rotation, so that the distance between the pivotal axis of the lever and the member on the bar increases and decreases respectively in direct proportion to the increase and decrease of resistance of the second shaft to rotation.

3. In a device of the class described, a shaft, a second rotatably mounted shaft, a lever fixed on said second shaft, a bar longitudinally slidably arranged on said lever, a member on said bar movable therewith relative to said lever, said member operatively connected to said lever so that the length of the line of travel between the pivotal axis of said lever and said member varies relative to the position of said bar on said lever, means for yieldingly holding said member in engagement with said lever at a starting point that defines the shortest line of travel therefrom to the pivotal axis of said lever, a second member operatively connected with said first shaft, said second member in slidable engagement with said bar, and said bar movable at right angles to said first shaft in response to resistance of said second shaft to rotation.

4. In a device of the class described, a shaft, a second rotatably mounted shaft, a lever fixed on said second shaft, a bar longitudinally slidably arranged on said lever, a member on said bar movable therewith relative to said lever, said member operatively connected to said lever so that the length of the line of travel between the pivotal axis of said lever and said member varies relative to the position of said bar on said lever, means for yieldingly holding said member in engagement with said lever at a starting point that defines the shortest line of travel therefrom to the pivotal axis of said lever, a second member operatively connected with said first shaft, said second member in slidable engagement with said bar, said bar movable at right angles to said first shaft in response to resistance of said second shaft to rotation so that the line of travel between the pivotal axis of said lever and said first mentioned member is longer than at the starting point, and means for holding said first member in its extended position when the resistance of said second shaft to rotation has terminated.

5. In a device of the class described, a shaft, a second rotatably mounted shaft, a lever fixed on said second shaft, a bar longitudinally slidably arranged on said lever, a member on said bar movable therewith relative to said lever, said member operatively connected to said lever so that the length of the line of travel between the pivotal axis of said lever and said member varies relative to the position of said bar on said lever, means for yieldingly holding said member in engagement with said lever at a starting point that defines the shortest line of travel therefrom to the pivotal axis of said lever, a second member operatively connected with said first shaft, said second member in slidable engagement with said bar, said bar movable at right angles to said first shaft in response to resistance of said second shaft to rotation so that the line of travel between the pivotal axis of said lever and said first mentioned member is longer than at the starting point, means for holding said first member in its extended position when the resistance of said second shaft to rotation has terminated, and means for releasing said holding means.

6. In a device of the class described, a shaft, a second rotatably mounted shaft, a lever fixed on said second shaft, a bar longitudinally slidably arranged on said lever, a member on said bar movable therewith relative to said lever, said member operatively connected to said lever so that the length of the line of travel between the pivotal axis of said lever and said member varies relative to the position of said bar on said lever, means for yieldingly holding said member in engagement with said lever at a starting point that defines the shortest line of travel therefrom to the pivotal axis of said lever, a second member operatively connected with said first shaft, said second member in slidable engagement with said bar, said bar movable at right angles to said first shaft in response to resistance of said second shaft to rotation so that the line of travel between the pivotal axis of said lever and said first mentioned member is longer than at the starting point, and hydraulic means for holding said first member in its extended position when the resistance of said second shaft to rotation has terminated.

7. In a device of the class described, a shaft, a second rotatably mounted shaft, a lever fixed on said second shaft, a bar longitudinally slidably arranged on said lever, a member on said bar movable therewtih relative to said lever, said member operatively connected to said lever so that the length of the line of travel between the pivotal axis of said lever and said member varies relative to the position of said bar on said lever, means for yieldingly holding said member in engagement with said lever at a starting point that defines the shortest line of travel therefrom to the pivotal axis of said lever, a second member operatively connected with said first shaft, said second member in slidable engagement with said bar, said bar movable at right angles to said first shaft in response to resistance of said second shaft to rotation so that the line of travel between the pivotal axis of said lever and said first mentioned member is longer than at the starting point, hydraulic means for holding said first member in its extended position when the resistance of said second shaft to rotation has terminated, and valve means for releasing said hydraulic holding means.

8. In a device of the class described, a shaft, a second rotatably mounted shaft associated with said first shaft for operation thereby, a lever fixed to said second shaft, means operatively connecting said first shaft and said lever, said means being movable whereby the connecting point between said shaft and said lever is variable in relation to the pivotal axis of said lever, means for yieldingly holding said first means in engagement with said lever at a starting point that defines the shortest line of travel therefrom to the pivotal axis of said lever, and said first means movable in response to a reaction force created by resistance of said second shaft to rotation so that the line of travel between the pivotal axis of said lever and said first means is longer than at the starting point.

9. A device as defined in claim 8 characterized by a hydraulic means for holding said first means in extended position when the reaction force has terminated, and a valve means for releasing said hydraulic means.

10. In a device of the class described, a shaft, a second rotatably mounted shaft associated with said first shaft for operation thereby, a lever fixed to said second shaft, a bar slidably arranged on said lever, a member on said bar movable therewith relative to said lever, said member in slidable engagement with said lever so that the length of the line of travel between the pivotal axis of the lever and said member varies relative to the position of the bar on the lever, a cylinder on said bar, a check valve means in said cylinder, a block operatively connected to said first shaft, said block provided with a chamber, said block in slidable engagement with said bar with said cylinder being slidable within said chamber, a yielding means engaging said bad and said block whereby said bar is normally held in a starting position that defines the shortest line of travel between the pivotal axis of the lever and said first member, said bar movable at right angles to said first shaft in response to a reaction force created by resistance of said second shaft to rotation so that the line of travel between the pivotal axis of the lever and said first member is longer than at the starting point, a source of oil supply communicating with said cylinder, the movement of said bar causing said cylinder to move in said chamber whereby oil passes through said cylinder into said chamber and serves as a holding means to prevent the return of said bar to its starting position, and a valve means associated with said chamber for releasing oil therefrom whereby said yielding means returns said bar to its starting position.

LORING S. PARKER.

References Cited in the file of this patent

UNITED STATES PATENTS

| Number | Name | Date |
|---|---|---|
| 1,218,071 | Flora | Mar. 6, 1917 |
| 1,276,237 | Lovejoy | Aug. 20, 1918 |
| 1,992,440 | Parker | Feb. 26, 1935 |

FOREIGN PATENTS

| Number | Country | Date |
|---|---|---|
| 480,054 | Great Britain | Feb. 16, 1938 |